United States Patent [19]
Welch

[11] Patent Number: 6,005,714
[45] Date of Patent: Dec. 21, 1999

[54] TWO LAYER OPTICAL ELEMENTS

[75] Inventor: W. Hudson Welch, Charlotte, N.C.

[73] Assignee: Digital Optics Corporation, Charlotte, N.C.

[21] Appl. No.: 08/982,475

[22] Filed: Dec. 2, 1997

Related U.S. Application Data

[62] Division of application No. 08/481,587, Jun. 7, 1995, Pat. No. 5,694,230.

[51] Int. Cl.⁶ .................................. G02B 5/18; G03H 1/00
[52] U.S. Cl. .............................. 359/576; 359/13; 359/572
[58] Field of Search ...................................... 359/572, 576, 359/13

[56] References Cited

U.S. PATENT DOCUMENTS

| | | |
|---|---|---|
| 4,426,130 | 1/1984 | Knop ........................................ 359/572 |
| 4,688,879 | 8/1987 | Fairchild . |
| 4,895,790 | 1/1990 | Swanson . |
| 4,900,133 | 2/1990 | Berman . |
| 4,902,100 | 2/1990 | Reynolds et al. . |
| 4,934,792 | 6/1990 | Tovi . |
| 4,981,332 | 1/1991 | Smith . |
| 5,119,231 | 6/1992 | Nelson et al. . |
| 5,153,751 | 10/1992 | Ishikawa et al. . |
| 5,161,059 | 11/1992 | Swanson et al. . |
| 5,162,927 | 11/1992 | Moss et al. . |
| 5,218,471 | 6/1993 | Swanson et al. . |
| 5,257,094 | 10/1993 | LaRussa . |
| 5,455,129 | 10/1995 | Bussard . |

FOREIGN PATENT DOCUMENTS 62-269104  11/1987  Japan ...................................... 359/576

OTHER PUBLICATIONS

Use of "X Prism" Concept article; undated—admitted prior art.

*Primary Examiner*—Cassandra Spyrou
*Assistant Examiner*—Darren E. Schuberg
*Attorney, Agent, or Firm*—Jones Volentine, L.L.P.

[57] ABSTRACT

An optical element is formed as a body having two layers, at least on of which is transmissive to a selected wavelength of a light of illumination. One layer is formed with a first surface relief optical formation as a boundary thereof, and the other layer is formed on the boundary so as to have an adjacent boundary that is a second surface relief optical formation that is the conjugate of the first surface relief optical formation. The other layer also has further optical features on a surface opposite the adjacent boundary. The formation and features are preferably diffractive. The further optical features opposite the adjacent boundary is preferably a compensated conjugate of the formation at the adjacent boundary.

15 Claims, 1 Drawing Sheet

TWO LAYER OPTICAL ELEMENTS

RELATED APPLICATIONS

The present application claims priority under 35 U.S.C. § 120, and is a divisional of, application Ser. No. 08/481,587 now U.S. Pat. No. 5,694,230, filed on Jun. 7, 1995, which is hereby incorporated by reference in its entirety.

BACKGROUND OF THE INVENTION

The present invention relates to improvements in two layer optical elements. In particular, the present invention is direct to providing an two-layer diffractive optical element which can be used in heads-up or head mounted display.

Typical holographic heads-up and head-mounted displays and head-up displays have relied on the use of Bragg selectivity for the combining function. The combiner combines light from a more-or-less completely monochromatic source such as a video display screen with ambient light made up of the fill spectrum. The frequency of the monochromatic light and the grating period of the holographic optical element are used to determine the characteristics of the combiner, including its placement and orientation, so that the monochromatic light approaches the combiner at the so-called "Bragg angle" to maximize the reflection of the monochromatic light. Deviations from the prescribed placement can lead to deviations in the angle and reduce the reflected light, thus reducing the ability of the element to act as a combiner.

Bragg selectivity requires the use of thick holograms Thick holograms are generally fabricated by exposing film with thick emulsions to laser beam interference patterns. They require tedious, precise alignment conditions between the laser beams, and controlled environmental conditions for exposure and subsequent development. Thus, high quality thick holograms are typically very expensive.

Thin holographic optical elements, on the other hand, are often referred to as diffractive optical elements (DOEs). DOEs can be fabricated with photolithographic techniques (such as are disclosed in U.S. Pat. Nos. 4,895,790; 5,161,059 and 5,218,471 to Swanson et al., the entire disclosures of which are hereby incorporated by reference) in a manner similar to the fabrication of integrated circuits and very compatible with mass production. Furthermore, since thin DOE's (unlike thick HOEs) can be represented entirely by a two-dimensional surface profile, they can be replicated very inexpensively through injection molding or embossing.

Due to the relatively high cost of thick HOE's, most prior art combiners for head-mounted displays have not used any HOEs or DOEs. In such cases, most typically the combiners are made with little or no magnifying power. Typically, magnification using refractive and/or reflective optics requires the use of curved optical elements. The use of curved optics for combiners results in larger aberrations of the transmitted image and often results in larger, bulkier optical systems. In order to reduce aberrations, a flat combiner is often used in conjunction with a curved optical element. This can reduce the bulkiness of the optical system and can reduce the aberrations, but at the expense of increased reflections, which decrease the system transmission efficiency and generate additional ghost images. These problems become even more severe as the field of view of the head-mounted or heads-up display increases.

With the advent of multimedia virtual reality displays, there is a need in the art for a low-cost, lightweight optical element for incorporation into a head-mounted display to be used as a combiner and for which power can be incorporated without introducing aberrations or requiring the use of additional optical components. Similarly, for head-up displays, there is a need for a low-cost power combiner that does not introduce aberrations in the scene viewed by, for example, an automobile driver. In both cases freedom to deviate from the necessity of locating the combiner at the Bragg angle is also very helpful.

SUMMARY OF THE INVENTION

The present invention fulfills this need in the art by providing a combiner for combining light from two fields of view to permit coincident viewing of the two fields of view including a light-transmissive substrate having first and second surfaces. The first surface has a first diffractive structure formed thereon and has a partially reflective characteristic, the first diffractive structure being configured to provide modified reflection to light from a first field of view which may be incident on the first surface. The second surface has a diffractive structure formed thereon as a substantial conjugate of the first diffractive structure, so that light on a second optical path which may be incident on the second surface passes through the second and first diffractive structures with substantially no net affect, whereby a viewer may look at the first surface and see the modified reflection of light on the first optical path combined with the substantially unaffected light on the second optical path.

The first and second diffractive structures may be computer-generated holograms. As used herein, a computer-generated hologram (CGH) is a DOE or HOE that is not generated by optical recording, i.e., by exposing film with the interference pattern of laser reference beam and object beam. Instead with a CGH, the desired pattern is calculated on computer. The computer file is used to directly fabricate the diffractive structure, usually as a surface relief pattern. Examples include fabrication by laser direct-write, e-beam direct-write, diamond turning or photolithography as described in the Swanson patents.

In one embodiment the substrate is quartz.

The first diffractive structure may be configured to correct aberrations in the light on the first optical path. Alternatively or additionally, the first diffractive structure may be configured to magnify an object in the first field of view. The first diffractive structure may be a blazed grating.

The partially reflective characteristic may be provided by a metal coating. The partially reflective coating may be reflective in a narrow bandwidth only. Alternatively, the partially reflective characteristic may arise from different indices of refraction between materials separated by the first surface. Preferably the substrate is between 0.4 and 2.0 mm in thickness.

In one embodiment the second surface is a boundary between two layers of the substrate. If so, preferably, the layers have differing indices of refraction. Preferably, the layers have indices of refraction that differ by at least 0.2. More preferably, the layers have indices of refraction that differ by at least 0.5. The substrate may have a base with the second diffractive structure formed thereon and a planarization layer with the first diffractive structure formed thereon. Thus, the base and planarization layer have differing indices of refraction.

The first and second surfaces may be outside faces of the substrate.

The invention also provides a head mounted display including a fixture to be disposed on a person's head, an image source adapted to emit light along a first optical path with a perceivable image, and a combiner arranged in the fixture for combining the light travelling on the first optical path with an ambient light to permit coincident viewing of light from the two optical paths. The combiner includes a light-transmissive substrate having first and second surfaces, the first surface having a first diffractive structure formed thereon and a partially reflective characteristic, the first diffractive structure and partially reflective characteristic configured to reflect light travelling on the first optical path as incident on the first surface, and the second surface having a diffractive structure formed thereon as a substantial conjugate of the first diffractive structure, so that the ambient light incident on the second surface passes through the second and first diffractive structures with substantially no net affect. Thus, a viewer may look at the first surface and see the reflection of the first optical path combined with the substantially unaffected ambient light. The combiner may be arranged in the fixture so that the first surface is not perpendicular to the viewer's line of sight.

The invention also provides a windshield for a vehicle having a portion suitable for a head-up display of vehicle information including a light-transmissive substrate having first and second surfaces, the first surface having a first diffractive structure formed thereon and a partially reflective characteristic, the first diffractive structure and partially reflective characteristic configured to provide modified reflection to light travelling on a first optical path bearing vehicle information which may be incident on the first surface. The second surface has a diffractive structure formed thereon as a substantial conjugate of the first diffractive structure, so that ambient light which may be incident on the second surface passes through the second and first diffractive structures with substantially no net affect. Thus, an occupant of the vehicle may look through the first surface and see the modified reflection of the first optical path to see the vehicle information combined with the substantially unaffected ambient light.

The invention also provides a method of combining visual images to a viewer comprising the steps of providing a combiner having a light-transmissive substrate having first and second surfaces, the first surface having a first diffractive structure formed thereon and a partially reflective characteristic, the second surface having a diffractive structure formed thereon as a substantial conjugate of the first diffractive structure, directing light along a first optical path toward the first surface, reflecting the light from the first surface in modified form, directing light along a second optical path toward the second surface from a direction opposed to the first surface, transmitting the light from the second optical path through the second and first diffractive structures with substantially no net affect, and looking at the first surface to see the modified, reflected form of the light from the first optical path combined with the substantially unaffected light from the second optical path.

The reflecting step may include magnifying features in the light travelling along the first optical path. The reflecting step may include reflecting in a narrow bandwidth only. The reflecting step may include correcting aberrations in the light travelling along the first optical path.

The transmitting step may include transmitting the light from the second optical path through a portion of the substrate before it encounters the second diffractive structure.

The invention also provides an optical element formed as a body having two layers that are transmissive to a selected wavelength of a light of illumination, one layer being formed with a first multi-level diffractive optical formation as a boundary thereof with a partially reflective coating on the first multilevel diffractive optical formation, and the other layer formed on the boundary so as to have an adjacent boundary surface that is a multi-level diffractive optical formation that is the conjugate of the first multi-level diffractive optical formation.

In one embodiment the boundary is partially reflective to the selected wavelength of the light of illumination. Preferably, the layers have indices of refraction that are substantially equal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in this art from this detailed description.

BRIEF DESCRIPTION OF THE DRAWINGS

The present invention will become more fully understood from the detailed description given hereinbelow in the accompanying drawings which are given by way of illustration only and thus are not limited to the present invention.

DETAILED DESCRIPTION OF THE PREFERRED EMBODIMENTS

Figure 1:
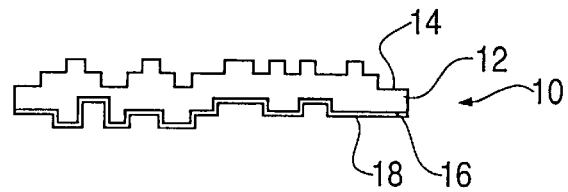
FIG. 1 is an optical element according to one embodiment of the invention.
Figure 2:
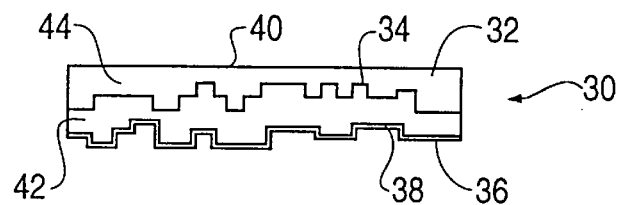
FIG. 2 is an optical element according to a second embodiment of the invention.
Figure 3:
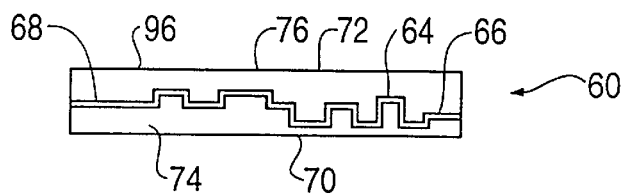
FIG. 3 is an optical element according to a third embodiment of the invention.

Referring to the drawings, FIGS. 1–3 show three different embodiments of optical elements by which the invention can be carried out. Referring first to FIG. 1, there is shown a typical element 10 of the first embodiment made up of a substrate 12 having formed on one surface a diffractive element 16 having the desired characteristics to be imparted to the image to be reflected. Those properties can be any properties of which diffractive, particularly multilevel diffractive, elements are capable, such as imparting power or correcting aberrations in the projected image. The use of the power element for the diffractive element 16 can increase the field of view of a viewer. Overlying the diffractive surface 16 is a partially reflective coating 18. The partially reflective coating can be any suitable optical grade reflective coating such as a deposited metal, or other coatings such as those known to those of ordinary skill in the art.

The other side 14 of the substrate 12 has formed on it a diffractive pattern which, in a first order of approximation, is the conjugate of the diffractive surface 16. Thus, light incident on the surface 14 will be modified by the diffractive features of that surface as it passes through the substrate 12. Upon reaching the conjugate surface 16, the modification of the transmitted light by the surface 14 will be reversed by the surface 16. However, certain errors can occur by forming the side 14 as the simple conjugate of the surface 16. The finite thickness of the substrate 12 will laterally shift to the light as it transits the substrate 12. Therefore, upon reaching the surface 16, the diffractive element the light encounters may not be the conjugate of the diffractive element the light encountered on the surface 14. Accordingly, it is preferred to modify the diffractive elements on the surface 14 to be a compensated, substantial conjugate of the elements on surface 16. As used herein a "substantial conjugate" is a diffractive pattern that is either an exact conjugate of a first diffractive pattern or a pattern modified to prevent errors arising from finite spacing between the two diffractive patterns and tending to negate the diffractions caused by the first diffractive pattern.

The modifications required to the conjugate diffraction pattern for the surface 14 can be ascertained by analyzing the surfaces in the system for which the elements are designed with conventional ray tracing techniques. There are several commercial ray tracing programs available that enable analysis of diffractive structures, including a software program entitled "Code V" made by Optical Research Company.

The preferred procedure for determining the precise diffractive structures is as follows. First, the reflected path is designed with a ray-tracing program. In most ray-tracing programs such as Code V, diffractive optical elements are treated as continuous elements. Only one diffracted order is modeled at a time. The reflective path will also typically include other refractive and/or diffractive elements.

Once the continuous profile of all elements in the reflective path is determined, the transmitted path is analyzed. At this point, according to embodiment of FIG. 1, for example, the continuous profile of surface 18 would be determined, but not surface 14. The transmitted path is then modeled with ray-tracing techniques. The continuous function on surface 14 can be optimized during this ray-tracing procedure to minimize aberrations in the transmitted path, without changing the surface profile on surface 16.

Once both continuous surface profiles have been obtained, they may be fabricated directly as continuous diffractive optical elements, for example by diamond turning, or by continuous laser direct-write. Alternatively, they can be quantized to discrete levels and fabricated as multi-level diffractive optical elements, by photolithographic techniques or by discrete level laser or e-beam direct write. For example, in U.S. Pat. Nos. 4,895,790; 5,161,059 and 5,218,471 to Swanson et al., assigned to Massachusetts Institute of Technology, Swanson discloses a method to convert a continuous HOE function generated with Code V to a discrete multi-level diffractive optical element. Swanson also discloses a method to fabricate such diffractive optical elements with photolithographic techniques.

Also, in U.S. Pat. No. 5,202,775 by Feldman et al., another method of determining the discrete profile, once the continuous profile is generated, is disclosed.

The disclosures of each of these references are incorporated herein by reference.

Upon ascertaining the features to be located on the surface 14, the substrate 12 can be formed using any of several technologies. Particularly preferred is a molding technology disclosed in co-pending U.S. patent application Ser. No. 08/381,169 to William H. Welch, and assigned to Digital Optics Corporation, assignee of the present application. This disclosure is hereby incorporated by reference.

Or, the substrate 12 may be formed by embossing a plastic substrate element with stamping molds formed with the desired features for the surfaces 14 and 16.

The formed substrate can then be coated with the partially reflective coating 18 in conventional manner. Alternatively, the coating 18 may be omitted and the difference in the index of refraction of the material of substrate 12 and the ambient (typically air) may be used to provide partial reflectivity.

FIG. 2 depicts a second embodiment 30 of an optical element in accordance with the invention. In the embodiment 30, the substrate 32 is made up of two substrate layers 42,44. In this embodiment, the layer 44 may be made, for example, of quartz having a plain side 40 and a featured side on which is etched the diffractive features 34 in accordance with the compensated conjugate of the diffractive features 36, determined according to the techniques described above. That is, the substrate 44, having the features 34 formed thereon, then has a layer 42 added thereto, such as by deposition of a plastic or the like with, perhaps, an etching or other fabrication technique used to obtain the surface 36. Then, the partially reflective coating 38 can be applied to the surface 36. (As with FIG. 1, the coating may be omitted, and reflectivity may be imparted by differences in indices of refraction.)

In the embodiment of FIG. 2 the materials of substrate 32, 34 should have differing indices of refraction. Preferably, the layers have indices of refraction that differ by at least 0.2. More preferably, the layers have indices of refraction that differ by at least 0.5. The substrate materials 42,44 are preferably made having a substantially large difference in their respective indices of refraction. For example, if one layer is glass and the other is silicon nitride, the layers have indices of refraction that differ by approximately 0.64. This will permit the transition at interior surface 34 to be of significance.

When light is incident on the optical element 10 of FIG. 1 from the side of surface 16, it is reflected by the reflective coating 18, but has imparted to it the modifications dictated by the diffractive elements formed on the surface 16, whether that be corrections, aberrations, magnifications, or the like. Light incident on the surface 14 will be modified by the diffractive elements formed thereon, which alter its path through the substrate 12. However, upon reaching the surface 16 which will have been the compensated conjugate of the surface 14, the modifications are largely canceled out, so that the light passing through the substrate 12 from side 14 to side 16 will be substantially unaffected.

The optical element 30 of FIG. 2 will act similarly. Thus, light incident on the surface 36 will be reflected by the coating 38 and modified by the diffractive elements formed on the surface 36. The coating 38 may be omitted if the difference in indices between air and layer 42 is sufficient. Or, the boundary 34 could have the reflective interface (by a coating or an index difference) with the viewing being done from the top in FIG. 2. Light incident on the surface 40 will pass through the surface 40 substantially unaffected by virtue of its planar characteristics and then be modified by the compensated conjugate diffractive elements on the interior surface 34 between the substrates 42,44. Then, as the light passes through the substrate layer 42, it will reach the surface 36 and be restored to its original path so as to appear substantially unaffected by the element 30.

A third embodiment 60 of an optical element in accordance with the invention is shown in FIG. 3. It is made up of two layered substrates 70,72, each having a substantially planar outer surface 74,76, respectively. However, the surfaces 74,76 need not be strictly planar and can be curved, such as the curvature of a windshield. However, they are not formed with intended refractive or diffractive properties.

Between the layers 70,72 is a boundary 66, having formed thereon the diffractive pattern desired for the light to be reflected. A reflective coating layer 68 between the surfaces 70,72 is provided partially reflective, like the coatings 18,38 of FIGS. 1 and 2. Thus, light incident on surface 74, such as from a cathode ray tube or other image source, passes through the surface 70 and encounters the reflective coating 68, which reflects the image back through the substrate 70. The reflected light thus has imparted to it, by virtue of the diffractive elements on boundary 66, the aberration, correction or power determined by that diffractive pattern. Light incident on surface 76 passes through the substrate 72, which is attached to the substrate 70 and has the precise conjugate 64 of the diffractive pattern on the boundary 66 by virtue of their intimate contact. Thus, the modifications to light transmitted through the surface 76 by the diffractive elements on surface 64 are immediately corrected by the diffractive elements on boundary 66 so that the light passes substantially through the combined layers 70,72 unaffected.

The optical element 60 may be manufactured as a substrate of quartz for the layer 70, forming thereon by conventional techniques such as etching, forming thereon diffractive elements such as on boundary 66, followed by deposition of a partially reflective coating 68 and a planarization layer 72. At present, FIG. 3 is the preferred embodiment.

Figure 4:
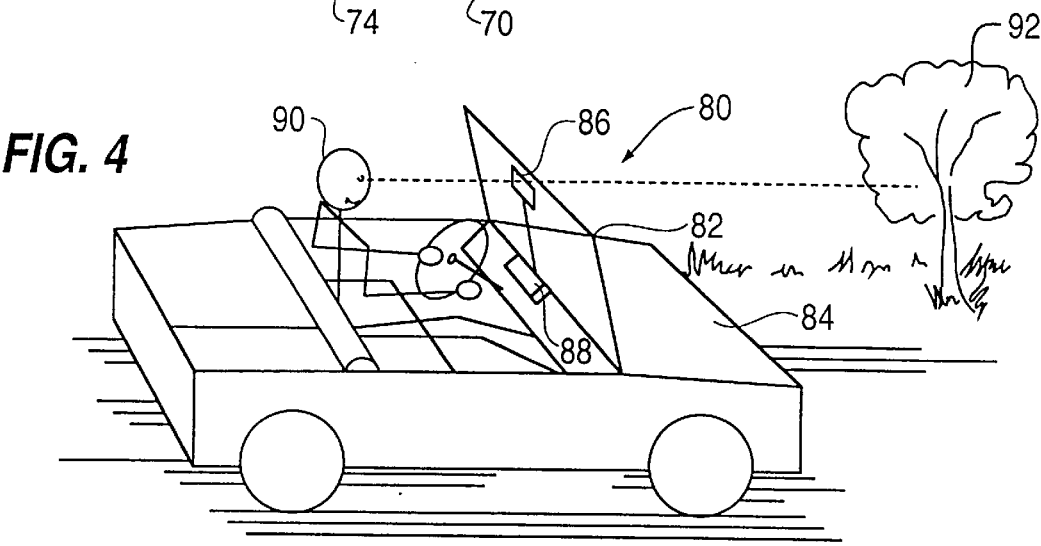
FIG. 4 is a schematic view of the optical element used as a combiner for a head up display on the windshield.

FIG. 4 depicts a typical use of the optical element according to any of FIGS. 1–3. The optical element 86 in this case is used as part of a head-up display 80 for an automobile 84. The optical element 86 is located on a windshield 82 of the automobile so that it is in plain view of the driver 90 while looking through the windshield, such as at scenery 92.

Disposed below the windshield 82 is a projector 88 for projecting automobile information of value to the driver 90, such as a speedometer display. The projected image is then visible to the driver 90 as reflected from the optical element 86. However, coincident with the image visible to the driver 90 from the projector 88 is light from the ambient 92 which passes through the windshield 82. Thus, the driver 90 can simultaneously view the automobile origin data from projector 88 and visual information from the ambient such as scenery 92.

The embodiments of FIGS. 1 and 2 will be made from refractive elements formulated in accordance with the transmissive diffractive analysis. That is, for example, in FIG. 1, the diffractive pattern on surface 14 will be made having regard to the index of diffraction of air ($N_1$), and the index of diffraction of the substrate 12, ($N_2$). Also, regard will be had to $\lambda$, the wavelength of the light to be reflected by the surface 18, and Q, the number of phase levels desired, as disclosed in the Swanson patents. The step height, d, of the features of the diffractive surface may be ascertained as $d = \lambda \div (N_1 - N_2)Q$, as taught in the Swanson patents.

For the formation of the diffractive elements on the surface 66 of the embodiments 60 of FIG. 3, the reflective mode of analysis should be used. Thus, for the substrate 70, having an index of refraction of, N, for a light of wavelength $\lambda$, a height, D, should be prescribed using the formula $D = \lambda \div 2NQ$.

In making the optical elements using plastics, the preferred plastics are acrylic and polycarbonate. Other preferred materials are glass, silicon nitride, having an index of refraction of 2.1, would make a suitable planarizing layer. Also, silicon dioxide having an index of 1.46 would be suitable. Other oxides, which typically have an indices in the range of 1.5 to 1.6 would also be suitable. Any material transparent to the operating wavelength would also be suitable.

In the embodiment of FIG. 3, preferably the two substrate layers 70 and 72 have the same or similar indices of refraction.

Figure 5:
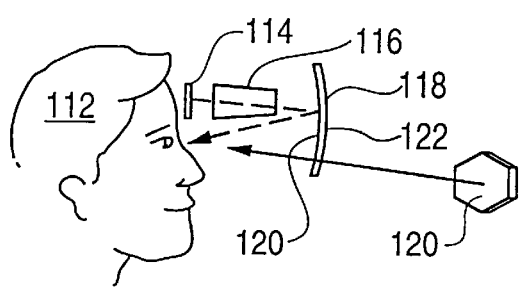
FIG. 5 is a schematic view of the optical element used as a combiner for a head mounted display.

FIG. 5 shows the use of a DOE 118 as a combiner for a head-mounted display. The head-mounted display includes a video image display 114. Other optical components 116 focus the light emanating from the display 114 on the combiner 118. The use of plastic items helps keep the weight of the head mounted display to a minimum. Generally, plastic refractive lenses are more dispersive than glass refractives. Hybrid diffractive, refractive components can be used to make lightweight plastic optical components with much less dispersion.

The combiner 118 is formed to have a surface 120 which has a diffractive element but is also reflective, so that the image on the display 114 is reflected back to the eye of viewer 112. However, the diffractive element on the combiner 118 can be used to modify the perception of the display, such as to make the viewer 112 see the image being displayed as taking place at perhaps a site 124. Furthermore, the diffractive element can compensate for aberrations. In addition, the combiner 118 has an outer surface 122 which is substantially transparent, so that light reflected off of a remote item 120 passes through the combiner 118 to the eye 112. A suitable surface can be molded on the outside surface 122 of the combiner 118 so that, as the light passes from the item 120 to the viewer 112, distorting effects of the diffractive elements on the surface 120 are canceled by complementary diffractive elements on the side 122.

This invention being thus described, it will be obvious that the same may be varied in many ways. Such variations are not to be regarded as a departure of the spirit and scope of the invention, and all such modifications as would be obvious to one skilled in the art are intended to be included within the scope of the following claims.

What is claimed is:

1. An optical element formed as a body having two layers, at least one of which is transmissive to a selected wavelength of illumination, the optical element comprising:

one layer formed with a first surface relief optical formation as a boundary thereof; and the other layer formed on said boundary so as to have an adjacent boundary that is a second surface relief optical formation that is the conjugate of the first surface relief formation, the other layer having further optical features on a surface opposite the adjacent boundary, wherein the first and second surface relief optical formations are diffractive formations and the further optical features includes a third surface relief diffractive optical formation that is a compensated conjugate of the diffractive formations.

2. An optical element as claimed in claim 1, wherein the further optical features are diffractive features.

3. An optical element as claimed in claim 1, wherein the one layer and the other layer have different respective indices of refraction.

4. An optical element as claimed in claim 3, wherein the indices of refraction differ by at least 0.2.

5. An optical element as claimed in claim 1, further comprising a reflective coating on the surface opposite the adjacent boundary.

6. An optical element as claimed in claim 1, wherein the adjacent boundary is a reflective interface.

7. An optical element as claimed in claim 1, wherein the adjacent boundary is partially reflective to the selected wavelength of the light of illumination.

8. A dual diffractive component comprising:

a substrate including,
- a first layer having a first index of refraction and a first diffractive structure formed as a surface relief profile on a first surface of said first layer, and
- a second layer having a second index of refraction and deposited on said first diffractive structure of said first layer and a second diffractive structure formed as a surface relief profile on a first surface of said second layer, both layers being transmissive to light at a selected wavelength of illumination, at least one of said first and second layers having further diffractive features on a second surface opposite said first surface, thereof, wherein the further diffractive features is a further surface relief profile that is a compensated conjugate of the surface relief profile.

9. An element as claimed in claim 8, wherein the first and second layers have different respective indices of refraction.

10. An optical element as claimed in claim 9, wherein the indices of refraction differ by at least 0.2.

11. An optical element as claimed in claim 8, further comprising a reflective coating on the second surface.

12. An optical element as claimed in claim 8, wherein a boundary between the first surfaces is partially reflective to light at the selected wavelength.

13. A dual diffractive component comprising:

a substrate including,
- a first layer having a first index of refraction and a first diffractive structure formed as a surface relief profile on a first surface of said first layer,
- a second layer having a second index of refraction and deposited on said first diffractive structure of said first layer and a second diffractive structure formed as a surface relief profile on a first surface of said second layer, both layers being transmissive to light at a selected wavelength of illumination, at least one of said first and second layers having further diffractive features on a second surface opposite said first surface, thereof, and
- a reflective coating on the second surface.

14. An optical element formed as a body having two layers, at least one of which is transmissive to a selected wavelength of illumination, the optical element comprising:

- one layer formed with a first surface relief optical formation as a boundary thereof;
- the other layer formed on said boundary so as to have an adjacent boundary that is a second surface relief optical formation that is the conjugate of the first surface relief formation, the other layer having further optical features on a surface opposite the adjacent boundary; and
- a reflective coating on the surface opposite the adjacent boundary.

15. An optical element formed as a body having two layers, at least one of which is transmissive to a selected wavelength of illumination, the optical element comprising:

- one layer formed with a first surface relief optical formation as a boundary thereof; and
- the other layer formed on said boundary so as to have an adjacent boundary that is a second surface relief optical formation that is the conjugate of the first surface relief formation, the other layer having further optical features on a surface opposite the adjacent boundary, wherein the adjacent boundary is a reflective interface.

* * * * *

UNITED STATES PATENT AND TRADEMARK OFFICE
CERTIFICATE OF CORRECTION

PATENT NO. : 6,005,714
DATED : December 21, 1999
INVENTOR(S) : W. Hudson WELCH

It is certified that error appears in the above-identified patent and that said Letters Patent is hereby corrected as shown below:

Column 1, before BACKGROUND OF THE INVENTION, please insert --This invention was made with Government support under DAAH01-94-C-R172 awarded by the U.S. Army Missile command. The Government has certain rights in this invention.--

Signed and Sealed this

Twenty-third Day of January, 2001

Attest:

Q. TODD DICKINSON

*Attesting Officer*                *Commissioner of Patents and Trademarks*